United States Patent [19]

Inoue et al.

[11] 3,917,554

[45] Nov. 4, 1975

[54] BUTADIENE-ACRYLONITRILE ALTERNATING COPOLYMER SOLUTION-TYPE ADHESIVE

[75] Inventors: Sakae Inoue; Ken Yoneyama; Motokazu Kikuchi, all of Kodaira; Nobuyuki Kataoka, Tokyo, all of Japan

[73] Assignee: Bridgestone Tire Co., Ltd., Tokyo, Japan

[22] Filed: Oct. 10, 1973

[21] Appl. No.: 405,176

Related U.S. Application Data

[63] Continuation-in-part of Ser. No. 861,961, Sept. 29, 1969, abandoned, and a continuation of Ser. No. 188,467, Oct. 12, 1971, abandoned.

[52] U.S. Cl... 260/30.4 A; 260/30.4 N; 260/32.6 A; 260/32.6 N; 260/32.8 A; 260/32.8 N; 260/33.2 R; 260/33.4 R; 260/33.6 A; 260/33.8 A; 260/845
[51] Int. Cl.²... C08K 5/02; C08K 5/04; C08K 5/15; C08L 9/02
[58] Field of Search..... 260/33.6 A, 32.8 A, 32.6 A, 260/845, 846, 41.5, 82.5 R, 30.4 A, 30.4 N

[56] References Cited
UNITED STATES PATENTS

| | | | |
|---|---|---|---|
| 3,658,775 | 4/1972 | Kawasaki | 260/82.5 |
| 3,700,637 | 10/1972 | Finch | 260/83.3 |
| 3,755,275 | 8/1973 | Kawasaki | 260/82.5 |
| 3,773,854 | 11/1973 | Furukawa | 260/82.5 |

FOREIGN PATENTS OR APPLICATIONS

| | | | |
|---|---|---|---|
| 685,861 | 5/1964 | Canada | 260/846 |

OTHER PUBLICATIONS

Skeist Handbook of Adhesives, Nitrile Rubber by Brown, pp. 229-247.

*Primary Examiner*—Allan Lieberman
*Attorney, Agent, or Firm*—Stevens, Davis, Miller & Mosher

[57] ABSTRACT

A butadiene-acrylonitrile alternating copolymer solution-type adhesive having 5–50 parts by weight of an adhesive composition composed of 100 parts by weight of a butadiene-acrylonitrile alternating copolymer having a degree of alternation of not lower than 92 and an intrinsic viscosity of not lower than 1.0 and containing no gel, which is prepared from butadiene and acrylonitrile in the presence of a catalyst consisting of a component (A) of a compound of metals of the groups IV-b and V-b in the Periodic Table and a component (B) of an organoaluminum compound, and 30–100 parts by weight of a phenol resin dissolved in 100 parts by weight of a solvent. This solution-type adhesive has excellent adhesion and storage stability and is used for adhering rubbers, plastics, fibers, woods and metals.

6 Claims, No Drawings

BUTADIENE-ACRYLONITRILE ALTERNATING COPOLYMER SOLUTION-TYPE ADHESIVE

This application is a continuation-in-part of our copending application Ser. No. 861,961 filed Sept. 29, 1969 now abandoned and its continuation application Ser. No. 188,467 filed Oct. 12, 1971 now abandoned.

BACKGROUND OF THE INVENTION

1. Field of the Invention

The present invention relates to an improved nitrile rubber solution-type adhesive. More particularly, the present invention relates to a butadiene-acrylonitrile alternating copolymer solution-type adhesive having 5–50 parts by weight of an adhesive composition composed of 100 parts by weight of a butadiene-acrylonitrile alternating copolymer having a degree of alternation of not lower than 92 and an intrinsic viscosity of not lower than 1.0 and containing no gel and 30–100 parts by weight of a phenol resin dissolved in 100 parts by weight of a solvent selected from the group consisting of ketones, amides, halogenated hydrocarbons and ethers.

2. Description of the Prior Art

Methods for producing nitrile rubber solution-type adhesives wherein a mixture of a conventional NBR obtained by an emulsion polymerization and a phenol resin is dissolved in a solvent, are described in Skeist, Handbook of Adhesive. However, in the conventional solution-type adhesive, only NBR having an acrylonitrile content of not higher than 35% is used. It has been known that an adhesive containing a rubber having polar groups, such as nitrile group and the like, generally increases its adhesion as the amount of the polar groups increases. Therefore, it has been demanded to develop adhesives having a nitrile content higher than the adhesive which uses conventional NBR having a nitrile content of 35–40% at the highest.

While, NBR having a nitrile content of not lower than 40%, particularly not lower than 45%, is insoluble in various solvents, and therefore among conventional NBRs prepared by an emulsion polymerization, one having a nitrile content of 48% is insoluble in solvents and is not suitable for the production of solution-type adhesive.

There has been disclosed a method in Skeist, Handbook of Adhesive, wherein NBR is made soluble by a milling operation. Further, Swift et al disclose in Canadian Pat. No. 685,861 that when NBR having a high nitrile content is masticated in the presence of a metal salt, such as $ZnCl_2$, the NBR can be dissolved in a solvent. However, as described in the following examples, even when conventional NBR having a nitrile content of 48% is subjected to the above described procedures, the NBR can not be dissolved completely in a solvent, and the NBR is not suitable for the production of solution-type adhesive.

The present invention relates to a novel solution-type adhesive containing a stereospecific high molecular weight butadiene-acrylonitrile alternating copolymer which has not hitherto been known. The alternating copolymer is produced in the presence of a specific catalyst which will be explained later, and has a characteristic structure that butadiene unit and acrylonitrile unit are bonded alternately, few of the monomer units connect continuously contrary to the case of conventional NBR, and the butadiene unit has a microstructure of substantially complete trans-1,4 bond, and is completely soluble in a specifically limited solvent inspite of the presence of as high as 50 mol% of acrylonitrile unit.

Recently, there have been reported several catalysts for the production of butadiene-acrylonitrile alternating copolymers. These catalysts are, for example, a catalyst composed of an organoaluminum compound alone or in admixture with an organic peroxide (U.S. Pat. No. 3,647,753), and a zinc chloride catalyst (N. G. Gaylord and A. Takahashi, 155th ACS National Meeting at San Francisco (March and Apr., 1968), Division of Industrial and Engineering Chemistry, 69). However, when these catalysts are used, a large amount of gel is formed during the polymerization reaction, and the catalysts are not suitable for the production of adhesive. Further, catalysts which can produce low molecular weight alternating copolymers have been known. However, such catalysts are also insufficient for the production of the adhesive of the present invention.

A. D. McLaren has reported that the adhesive strength of an adhesive increases as the polymerization degree (intrinsic viscosity) of a copolymer used in the adhesive increases (Paper Trade J., 125, 96 (Nov. 1947), Ind. Eng. Chem., 40, 329 (Feb. 1948) and J. Polymer Sci., 3, 652, (1948)).

The inventors have found that butadiene-acrylonitrile alternating copolymers having an intrinsic viscosity of not lower than 1.0 measured at 30°C in dimethylformamide are preferably used in the present invention.

According to the present invention, a solution-type adhesive having a high adhesion, which can not be anticipated in the use of conventional nitrile rubber solution-type adhesives, can be obtained by using a butadiene-acrylonitrile alternating copolymer having a specific structure produced in the presence of a specific catalyst.

SUMMARY OF THE INVENTION

The butadiene-acrylonitrile alternating copolymer to be used in the present invention is a copolymer having a degree of alternation of not lower than 92 and an intrinsic viscosity of not lower than 1.0 and containing no gel, which is prepared by copolymerizing butadiene and acrylonitrile in the presence of a catalyst prepared from a component (A): at least one transition metal compound soluble in the monomer solution selected from the group consisting of halides, alkoxides, acetylacetonates, and carboxylic acid salts of metals and oxy-metals of the Groups IV-b and V-b in the Periodic Table, and a component (B); an aluminum-containing component selected from the group consisting of organoaluminum compounds having the general formulae $R_2AlX$, $R_3Al_2X_3$, and $RAlX_2$ and a combination of two or more aluminum compounds having the general formulae $R_2AlX$, $R_3Al_2X_3$, $RAlX_2$, $R_3Al$, and $AlX_3$ wherein R represents an alkyl radical having 1-10 carbon atoms and X represents a halogen radical selected from the group consisting of Cl and Br atoms, and wherein the ratio of the total number of the hydrocarbon radicals to the total number of halogen atoms in said aluminum-containing component is a positive number not greater than 2.0, and R and X in the aluminum compounds constituting said component (B) may be the same or different.

When the above described catalyst is used, butadiene-acrylonitrile alternating copolymers having a high degree of alternation ($F_{AB} \geqq 92$) and a high molecular weight (intrinsic viscosity $[\eta] \geqq 1.0$) and containing no gel can be produced in a high reproducibility. The degree of alternation of the alternating copolymer is determined from the NMR spectrum as described later.

On the contrary, conventional free radical polymerization process or emulsion polymerization process produces only copolymers having a low degree of alternation ($F_{AB} < 80$). Adhesives produced by using a copolymer having a low degree of alternation are insufficient in the adhesion as described in the following examples, and are outside the scope of the present invention. Further, adhesives produced by using a low molecular weight alternating copolymer are also insufficient in the adhesion.

The degree of alternation of the butadiene-acrylonitrile alternating copolymer to be used in the present is preferred to be not lower than 92, particularly not lower than 95. The polymerization degree of the copolymer is preferred to be an intrinsic viscosity of not lower than 1.0, particularly within the range of 1.3–2.0.

In the present invention, any of bulk polymerization, suspension polymerization and solution polymerization processes may be used for the production of the copolymer. However, suspension polymerization process is preferable, because mass production of the copolymer is possible.

The solution-type adhesive produced from the above described butadiene-acrylonitrile alternating copolymer has an excellent adhesion. Moreover, the use of the alternating copolymer in the production of solution-type adhesive has the following merits.

1. The solution viscosity of the alternating copolymer is considerably lower than that of conventional NBR having the same Mooney viscosity. For example, when solution viscosities of polymers having the same Mooney viscosity, which polymers are a butadiene-acrylonitrile alternating copolymer of the present invention, a butadiene-acrylonitrile copolymer having a low degree of alternation shown in the following Example 5, which has the same acrylonitrile content as the above described alternating copolymer, and JSR N220S and JSR N230S (trademarks of NBRs made by Japan Synthetic Rubber Co., Ltd.) were measured under the same concentration and condition, i.e., measured in a 20% methyl ethyl ketone solution by means of a B-type viscosimeter, No. 3 rotor at 25°C and 60 rpm., the solution viscosities of the polymers were 646 cps., 772 cps., 944 cps. and 1,430 cps., respectively. That is, the butadiene-acrylonitrile alternating copolymer is lower in the solution viscosity than the butadiene-acrylonitrile copolymer having a low degree of alternation, and commercial N220S and N230S. This property is very advantageous when the alternating copolymer is used as an adhesive, and the application of the adhesive by means of a brush is very easy.

2. The solution of the alternating copolymer is more stable than that of conventional NBR, and further the variation of the solution viscosity and the deterioration of the quality during storage of the alternating copolymer are smaller.

3. The alternating copolymer has a high solubility in a solvent. Moreover, the alternating copolymer has a high compatibility with a phenol resin, and a homogeneous adhesive composition can be obtained in a short period of time.

The above described merits can be obtained only when the butadiene-acrylonitrile alternating copolymer is used in the adhesive composition.

DETAILED DESCRIPTION OF THE PREFERRED EMBODIMENTS

The catalyst to be used in the production of the butadiene-acrylonitrile alternating copolymer of the present invention is prepared from the following catalytic components (A) and (B).

The catalytic component (A) is at least one transition metal compound soluble in the monomer solution selected from the group consisting of halides, alkoxides, acetylacetonates, and carboxylic acid salts of metals and oxy-metals of the Groups IV-$b$ and V-$b$ in the Periodic Table. As the catalytic component (A), mention may be made of vanadyl trichloride, vanadyl tribromide, vanadyl diacetylacetonate, vanadium triacetylacetonate, tri-tert-butoxy vanadyl, triethoxy vanadyl, di-tert-butoxy vanadyl chloride, tert-butoxy vanadyl dichloride, vanadium tetrachloride, tetra-n-butoxy titanium, tetra-iso-propoxy titanium, di-n-butoxy titanium dichloride, oxy-titanium diacetylacetonate, vanadyl acetate, vanadyl naphthenate, vanadyl oxalate, titanium tetrachloride, titanium acetate, titanium triacetylacetonate, titanium oxalate and combinations thereof. Among them, vanadyl trichloride and vanadyl tribromide are particularly preferable.

The catalytic component (B) is an aluminum-containing component selected from the group consisting of organoaluminum compounds having the general formulae $$R_2AlX, R_3Al_2X_3, \text{ and } RAlX_2$$

and a combination of two or more aluminum compounds having the general formulae $$R_2AlX, R_3Al_2X_3, RAlX_2, R_3Al, \text{ and } AlX_3,$$

wherein R represents an alkyl radical having 1–10 carbon atoms and X represents a halogen radical selected from the group consisting of Cl and Br atoms, and wherein the ratio of the total number of the hydrocarbon radicals to the total number of halogen atoms in said aluminum-containing component is a positive number not greater than 2.0, and R and X in the aluminum compounds constituting said component (B) may be the same or different. As the catalytic component (B), mention may be made of organoaluminum compounds, such as ethylaluminum dichloride, ethylaluminum dibromide, ethylaluminum sesquichloride, ethylaluminum sesquibromide, diethylaluminum chloride, methylaluminum dichloride, methylaluminum sesquichloride, isobutylaluminum dichloride, propylaluminum dichloride, propylaluminum sesquichloride, isobutylaluminum dibromide, propylaluminum sesquichloride, isobutylaluminum sesquichloride, and a combination of the above described organoaluminum compound with the following aluminum compound, and a combination of two or more of the following aluminum compounds. The aluminum compound includes aluminum trichloride, aluminum tribromide, trimethylaluminum, triethylaluminum, tripropylaluminum, triisobutylaluminum, tri-n-butylaluminum, dimethylaluminum chloride, diethylaluminum bromide, diisobutylaluminum chloride. As the catalytic component (B), a combination of aluminum trichloride and triethylaluminum or a combination of aluminum trichloride and triisobutylaluminum is particularly preferable.

When butadiene and acrylonitrile are copolymerized by using a catalyst prepared from the catalytic components (A) and (B), it is necessary that the catalytic components (A) and (B) are contacted in the presence of acrylonitrile. That is, when the catalytic components (A) and (B) are contacted in a system containing no acrylonitrile, for example, in a system containing only solvent or in a system containing only butadiene monomer, the activity of the resulting catalyst is considerably low, and such processes are not preferable.

The copolymerization reaction can be carried out by any of bulk polymerization process, solution polymerization process and suspension polymerization process. However, suspension polymerization process is preferable, because mass production of the alternating copolymer of the present invention is possible.

The polymerization temperature is within the range of $-78°$ to $+50°C$, preferably $-30°$ to $+20°C$.

According to the above described method, high molecular weight butadiene-acrylonitrile alternating copolymers having a high degree of alternation and containing no gel can be easily obtained.

The "degree of alternation" of the resulting copolymer can be determined from the NMR spectrum in the following manner.

The butadiene-acrylonitrile copolymer obtained in the invention was dissolved in deuterochloroform to prepare a solution having about 10% by weight concentration. The NMR spectrum of the solution was measured at 60°C with the use of tetramethylsilane as an internal standard material by means of a J.N.M.-4H-100 type NMR spectrometer made by Japanese Electron Optics Laboratory Co., Ltd.

An information with respect to the degree of alternation, which was one of the most important factors for the alternating copolymer obtained in the invention, was obtained by analyzing the NMR spectrum.

The degree of alternation of a copolymer relates to the arrangement of monomer units in the copolymer, and is shown by the ratio of the number of bonds between acrylonitrile unit and butadiene unit to the total number of bonds between monomer units in an alternating copolymer. This degree of alternation is shown by the following formula $$F_{AB} = [AB] \times 100/([AA] + [AB] + [BB])$$

In the formula, $F_{AB}$ represents degree of alternation, and [AB], [AA] and [BB] represent the number of bonds between acrylonitrile unit and butadiene unit, that between acrylonitrile unit and acrylonitrile unit, and that between butadiene unit and butadiene unit in the copolymer, respectively.

The chemical shift of typical proton assigned to the bond between the above-mentioned monomer units can be found by the analysis of the NMR spectrum. As a key band for the bond between acrylonitrile unit and acrylonitrile unit, a chemical shift at 7.15 $\tau$ assigned to methine proton adjacent to the acrylonitrile unit is selected. As a key band for the bond between butadiene unit and acrylonitrile unit, a chemical shift at 7.72 $\tau$ assigned to methylene proton of butadiene unit adjacent to the acrylonitrile unit is selected. As a key band for the bond between butadiene unit and butadiene unit, a chemical shift at 7.90 $\tau$ assigned to methylene proton adjacent to butadiene unit is selected. Then, the area of each key band is determined from the measured NMR spectrum based on the above assignment by using a Du Pont 310 Curve resolver, and [AA], [AB] and [BB] were calculated according to the following formulae, respectively.

$$[AA] = k\ S_{AA}$$
$$[AB] = k\ S_{AB}/2$$
$$[BB] = k\ S_{BB}/4$$

In the above formulae, $S_{AA}$ : area of methine proton at a key band of 7.15 $\tau$, $S_{AB}$ : area of methylene proton at a key band of 7.72 $\tau$, and $S_{BB}$ : area of methylene proton at a key band of 7.90 $\tau$.

The degree of alternation $F_{AB}$ can be easily calculated from the above obtained [AA], [AB] and [BB].

It was found from the above mentioned analysis that the copolymer obtained by this invention had a degree of alternation of not lower than 92.0%, and was an alternating copolymer in which acrylonitrile unit and butadiene unit were bonded in a high degree of alternation.

On the other hand, when the degree of alternation of copolymers having a nitrile content of about 50 mol% and prepared in a polymerization process by using a conventional free radical initiator was determined by NMR spectrum, the degree of alternation was 76–81%, although it was varied depending upon the copolymerization condition. Therefore, this degree of alternation of the conventional copolymer is considerably lower than that of the copolymer obtained in the present invention.

The intrinsic viscosity of the resulting butadiene-acrylonitrile alternating copolymer is measured at 30°C in dimethylformamide. When the copolymerization reaction is effected in the presence of the above described catalyst under a proper condition, butadiene-acrylonitrile alternating copolymers having an intrinsic viscosity of not lower than 1.0 can be easily obtained.

The after-treatment of the resulting copolymer can be effected by a conventional method. Further, various functional groups may be introduced into the copolymer. The functional groups include hydroxyl group, carboxyl group, amino group, isocyanate group and the like.

As the phenol resin to be used in the present invention, any conventional phenol resins for adhesive can be used, and the following resins are commercially available.

Durez 12687 (made by Durex Plastic and Chemical Inc.)

Durez 11098 (ditto)

Sumilite Resin PR-12687 (made by Sumitomo-Durez Co., Ltd.)

The amount of the phenol resin to be compounded is determined depending upon the viscosity and adhesion of the resulting adhesive, and is 30–100 parts by weight based on 100 parts by weight of the butadiene-acrylonitrile alternating copolymer.

The phenol resin is compounded with the butadiene-acrylonitrile alternating copolymer on a conventional compounding roll. Since the alternating copolymer is superior to conventional NBR in the processability on the roll and in the compatibility with phenol resin, homogeneous adhesive composition can be obtained in a short period of time.

The adhesive composition is dissolved in a solvent selected from the group consisting of ketones, amides, halogenated hydrocarbons and ethers to prepare a solution-type adhesive.

As the solvent, mention may be made of acetone, methyl ethyl ketone, methyl isobutyl ketone, methylene chloride, chloroform, ethylene dichloride, chlorobenzene, dichlorobenzene, dioxane, tetrahydrofuran, etc., and mixtures thereof.

Of course, a mixed solvent composed of the above described solvent and small amounts of hydrocarbon and alcohol can be used.

The adhesive composition is dissolved in the solvent in an amount of 5–50 parts by weight, preferably 10–30 parts by weight, based on 100 parts by weight of the solvent.

The solution-type adhesive of the present invention is used for adhering rubbers, plastics, fibers, woods, metals and the like.

The following examples are given for the purpose of illustration of this invention and are not intended as limitations thereof.

EXAMPLE 1

A glass reactor was dried and deaired and then substituted with purified gaseous nitrogen and then acrylonitrile was fed under nitrogen atmosphere. This reactor was cooled to −78°C in dry ice-methanol system and added with ethylaluminum dichloride and oxyvanadium trichloride (Al/V = 40 molar ratio) and further added with liquefied butadiene (acrylonitrile/butadiene − 1.0 molar ratio) and the content was mixed thoroughly and then the reactor was closed under nitrogen atmosphere and left to stand at 0°C for 20 hours and the content was introduced into a large amount of methanol dissolved a small amount of phenyl-$\beta$-naphthylamine to stop the copolymerization, thereby a white rubbery elastic copolymer was obtained.

The concentration of acrylonitrile, butadiene, ethylaluminum dichloride and oxyvanadium trichloride were 6.63 mol/l, 6.63 mol/l, 0.265 mol/l and 0.0703 mol/l, respectively.

The yield of the resulting copolymer after purification and drying was 30%. When this copolymer was dissolved in tetrahydrofuran, gel was not formed. The copolymer contained butadiene unit of 98% of trans-1,4-structure and had a Mooney viscosity of 60.

The NMR spectrum of the resulting copolymer was measured, and it was found that the copolymer had a degree of alternation of 95.8. Further, the copolymer had an intrinsic viscosity of 1.53 in dimethylformamide at 30°C.

The resulting butadiene-acrylonitrile alternating copolymer and the following conventional NBRs were examined with respect to the solubility in methyl ethyl ketone.

Hycar 1000×132 (acrylonitrile content: 48%, made by Japanese Zeon Co., Ltd.)
JSR N220S (acrylonitrile content: 41–36%, made by Japan Synthetic Rubber Co., Ltd.)
JSR N230S (acrylonitrile content: 35–31%, made by Japan Synthetic Rubber Co., Ltd.)

The butadiene-acrylonitrile alternating copolymer or the NBR was mixed with 4 times amount of methyl ethyl ketone after mastication or without mastication, and the resulting mixture was left to stand for 24 hours at room temperature while shaking at intervals to dissolve the rubber in the solvent. Then, the solubility of the rubber in methyl ethyl ketone was measured.

In the above procedure, the NBR having an acrylonitrile content of 48% (Hycar 1000×132) was masticated alone or together with 6 parts by weight or 14 parts by weight of ZnCl$_2$ based on 100 parts by weight of the NBR according to the method disclosed by Swift et al in Canadian Pat. No. 685,861.

The obtained results are shown in the following Table 1.

Table 1

| Nitrile rubber | | Butadiene-acrylonitrile alternating copolymer | NBR (Hycar 1000×132) | | | NBR (JSR N220S) | NBR (JSR N230S) |
| --- | --- | --- | --- | --- | --- | --- | --- |
| | | | No ZnCl$_2$ | Compounded with 6 parts of ZnCl$_2$ | Compounded with 14 parts of ZnCl$_2$ | | |
| Nitrile content (mol %) | | 50 | 48 | 48 | 48 | 41–36 | 35–31 |
| Intrinsic viscosity [$\eta$] | | 1.5 | measurement is impossible | measurement is impossible | measurement is impossible | not measured | not measured |
| Degree of alternation ($F_{AB}$) | | 95 | ≈78 | ≈78 | ≈78 | — | — |
| Solubility | Not masticated | soluble | insoluble | — | — | partly soluble | partly soluble |
| | Masticated | soluble | partly soluble | partly soluble | partly soluble | soluble | soluble |

It can be seen from Table 1 that the butadiene-acrylonitrile alternating copolymer of the present invention is remarkably superior to Hycar 1000×132 (acrylonitrile content: 48%) in the solubility, and even when Hycar 1000×132 was previously masticated in the presence of ZnCl$_2$, the NBR can not be completely dissolved in the solvent.

EXAMPLE 2

On a roll for kneading rubber was wound around 100 parts by weight of the butadiene-acrylonitrile alternating copolymer produced in Example 1 or an NBR shown in the following Table 2, and 50 parts by weight of a phenol resin for adhesive was gradually added thereto.

Then, the resulting adhesive composition was dissolved in 4 times amount of methyl ethyl ketone or of a mixed solvent composed of 60% by weight of methyl ethyl ketone, 36% by weight of toluene and 4% by weight of isopropyl alcohol in a tank equipped with a stirrer to obtain a solution-type adhesive.

The resulting adhesive was applied on a material to be adhered by means of a brush and dried for about 30 minutes. Then, the same material was superposed thereon, and the resulting assembly was hot pressed to obtain a test piece for adhesion.

The adhesion test was effected as follows. In the case of vulcanized rubber, nylon sheet, a peeling test (unit: Kg/2.5 cm) was effected with respect to a test piece having a width of 2.5 cm, and in the case of wood and iron, an adhesion test for shearing strength (unit: Kg/2.5×2.5 cm$^2$) was effected with respect to a test piece having a dimension of 2.5 cm.

The obtained results are shown in the following Table 2.

Table 2

| Nitrile rubber | | Butadiene-acrylonitrile alternating copolymer | NBR | | |
|---|---|---|---|---|---|
| | | | Hycar 1000×132 | JSR N220S | JSR N230S |
| Nitrile content (mol %) | | 50 | 48 | 41–36 | 35–31 |
| Vulcanized NBR sheet | MEK[*1] | 50–55[*2] | — | 18.7 | 2.6 |
| | Mixed solvent | 50–55[*2] | — | 17.7 | 2.4 |
| Vulcanized SBR sheet | MEK | 11.9 | — | 8.7 | 1.6 |
| | Mixed solvent | 11.9 | — | 9.6 | 1.7 |
| Nylon sheet | MEK | 6.4 | — | 3.0 | 0.1 |
| | Mixed solvent | 8.1 | — | 2.9 | 0.1 |
| Iron | MEK | 377 | — | 168 | 76 |
| | Mixed solvent | 346 | —243 | 69 | |
| Wood | MEK | 315 | — | 270 | 64 |
| | Mixed solvent | 320 | — | — | 42 |

[*1] methyl ethyl ketone
[*2] When peeling test reached these values, rubber itself was broken, but the adhered portion maintained the adhesion without peeling off.

As seen from Table 2, the solution-type adhesive prepared from the butadiene-acrylonitrile alternating copolymer has an adhesion considerably higher than the solution-type adhesives prepared from conventional NBRs. Hycar 1000×132 was insoluble in both of methyl ethyl ketone and the mixed solvent, and it was impossible to produce a homogeneous solution-type adhesive.

EXAMPLE 3

In the same manner as described in Example 2, 100 parts by weight of the butadiene-acrylonitrile alternating copolymer obtained in Example 1 or an NBR shown in the following Table 3 was compounded with 100 parts by weight of a phenol resin, and the resulting adhesive composition was dissolved in 4 times amount of a mixed solvent having the same composition as described in Example 2 to obtain a solution-type adhesive.

The adhesion test of the resulting adhesive was effected in the same manner as described in Example 2. The obtained results are shown in Table 3.

Table 3

| Nitrile rubber | Butadiene-acrylonitrile alternating copolymer | NBR | |
|---|---|---|---|
| | | Hycar 1000×132 | JSR N220S |
| Nitrile content (mol %) | 50 | 48 | 41–36 |
| Vulcanized SBR sheet | 19.5 | — | 7.4 |
| Cotton sheet | 10.8 | — | 5.8 |
| Nylon sheet | 17.0 | — | 6.2 |
| Iron | 357 | — | 258 |
| Wood | 360 | — | 257 |

As seen from Table 3, the solution-type adhesive prepared from the butadiene-acrylonitrile alternating copolymer has an adhesion considerably higher than the solution-type adhesive prepared from JSR N220S. It was impossible to produce a homogeneous solution-type adhesive from Hycar 1000×132.

EXAMPLE 4

100 parts by weight of each of the butadiene-acrylonitrile alternating copolymer obtained in Example 1 and NBRs shown in the following Table 4 was compounded on a roll with 30 or 100 parts by weight of a phenol resin, 10 parts by weight of a coumarone-indene resin, 3 parts by weight of zinc white, 1.0 part of stearic acid, 1.5 parts by weight of sulfur and 1.0 part by weight of dibenzothiazyl disulfide in the same manner as described in Example 2, and the resulting adhesive composition was dissolved in 4 times amount of methyl ethyl ketone to prepare a solution-type adhesive.

An iron test piece was produced from the resulting adhesive in the same manner as described in Example 3. The iron test piece was immersed in JIS No. 3 oil (kinetic viscosity: 31.96–34.18 centistokes, aniline point: 69.5±1°C, flash point: 166±5°C) at 100°C for 70 hours, taken up from the oil, and cooled to room temperature, and then an adhesion test for shearing strength (unit: Kg/2.5×2.5 cm$^2$) was effected.

The obtained results are shown in the following Table 4.

Table 4

| Nitrile rubber | Butadiene-acrylonitrile alternating copolymer | NBR Hycar 1000×132 | NBR JSR N220S | NBR JSR N230S |
| --- | --- | --- | --- | --- |
| Acrylonitrile content (mol %) | 50 | 48 | 41–36 | 35–31 |
| Compounded amount of phenol resin 30 (parts by weight) | 20 | — | 9 | 7 |
| Compounded amount of phenol resin 100 (parts by weight) | 130 | — | 86 | 85 |

EXAMPLE 5

Butadiene and acrylonitrile were subjected to a bulk polymerization in the presence of a catalyst of azobisisobutyronitrile to obtain a copolymer having an acrylonitrile content of 48.9%. The copolymer had an intrinsic viscosity of 1.69 in dimethylformamide at 30°C and a degree of alternation of about 78. 100 parts by weight of the resulting butadiene-acrylonitrile copolymer having a low degree of alternation, a conventional NBR having an acrylonitrile content of 41% (JSR N220S) or the butadiene-acrylonitrile alternating copolymer having a high degree of alternation produced in Example 1 was compounded with 50 parts by weight of a phenol resin on a roll, and the resulting adhesive composition was dissolved in a mixed solvent composed of 60% by weight of methyl ethyl ketone, 36% by weight of toluene and 4% by weight of isopropyl alcohol to prepare a solution-type adhesive containing 20% by weight of the rubber.

The adhesive was applied once to a vulcanized SBR sheet by means of a brush, on which another vulcanized SBR sheet was superposed, and the resulting assembly was hot pressed at 150°C for 30 minutes under a pressure of 5-10 Kg/cm$^2$ to prepare a test piece for adhesion. After 24 hours, a peeling test (unit: Kg/2.5 cm) was effected.

The obtained results are shown in the following Table 5.

Table 5

| Nitrile rubber | Butadiene-acrylonitrile alternating copolymer (high degree of alternation) | Butadiene-acrylonitrile copolymer (low degree of alternation) | NBR (JSR N220S) |
| --- | --- | --- | --- |
| Vulcanized SBR sheet | 11.25 | 1.25 | 6.25 |

As seen from Table 5, the adhesive prepared from the alternating copolymer having a high degree of alternation has an adhesion considerably higher than the adhesives prepared from the copolymer having a low degree of alternation and JSR N220S.

EXAMPLE 6

Solution-type adhesives were produced in the same manner as described in Example 5, except that 100 parts by weight of the rubbers used in Example 5 was compounded with 100 parts by weight of a phenol resin.

A test piece of a nylon sheet was prepared in the same manner as described in Example 5, and a peeling test (unit: Kg/2.5 cm) was effected.

The obtained results are shown in the following Table 6.

Table 6

| Nitrile rubber | Butadiene-acrylonitrile alternating copolymer (high degree of alternation) | Butadiene-acrylonitrile copolymer (low degree of alternation) | NBR (JSR N220S) |
| --- | --- | --- | --- |
| Nylon sheet | 6.25 | 3.75 | 2.50 |

As seen from Table 6, the adhesive prepared from the alternating copolymer having a high degree of alternation had an adhesion higher than the adhesives prepared from the copolymer having a low degree of alternation and JSR N220S.

What is claimed is:

1. A butadiene-acrylonitrile alternating copolymer solution-type adhesive having 5–50 parts by weight of an adhesive composition composed of 100 parts by weight of a butadieneacrylonitrile alternating copolymer having a degree of alternation of not lower than 92 and an intrinsic viscosity of not lower than 1.0 in dimethylformamide at 30°C and containing no gel, wherein the butadiene units have a microstructure of substantially complete trans-1,4 bond, and 30–100 parts by weight of a phenol resin dissolved in 100 parts by weight of a solvent selected from the group consisting of ketones, amides, halogenated hydrocarbons and ethers, a mixed solvent of two or three of the solvents or a mixed solvent of said solvent with at least one of aromatic hydrocarbons and alcohols.

2. The solution-type adhesive as claimed in claim 1, wherein said solvent is a member selected from the group consisting of methyl ethyl ketone, dimethylformamide, methylene chloride, chloroform, ethylene dichloride and tetrahydrofuran, and a mixed solvent of said solvent with toluene and isopropyl alcohol.

3. The solution-type adhesive as claimed in claim 1, wherein said adhesive composition is composed of 100 parts by weight of the alternating copolymer and 40–80 parts by weight of a phenol resin.

4. The solution-type adhesive as claimed in claim 1, wherein said adhesive composition is dissolved in the solvent in an amount of 10–30 parts by weight based on 100 parts by weight of the solvent.

5. The solution-type adhesive as claimed in claim 1, wherein said butadiene-acrylonitrile has a degree of alternation not lower than 95.

6. The solution-type adhesive as claimed in claim 1, wherein said butadiene-acrylonitrile has an intrinsic viscosity of from 1.3-2.0 in dimethylformadide at 30°C.

* * * * *